United States Patent [19]

Eisinger et al.

[11] Patent Number: 5,264,506
[45] Date of Patent: Nov. 23, 1993

[54] PROCESS FOR PRODUCING STICKY POLYMERS

[75] Inventors: Ronald S. Eisinger, Charleston; Fathi D. Hussein, Cross Lanes, both of W. Va.; David N. Edwards, Chicago, Ill.; Kiu H. Lee, South Charleston, W. Va.

[73] Assignee: Union Carbide Chemicals & Plastics Technology Corporation, Danbury, Conn.

[21] Appl. No.: 998,826

[22] Filed: Dec. 30, 1992

[51] Int. Cl.$^5$ .............................. C08F 2/34; C08F 4/02
[52] U.S. Cl. ...................................... 526/194; 526/74; 526/88; 526/129; 526/130; 526/156; 526/168; 526/282; 526/335; 526/348; 526/901; 526/908
[58] Field of Search ................ 526/63, 129, 130, 194, 526/908, 88, 156, 168, 74

[56] References Cited

U.S. PATENT DOCUMENTS

| | | | |
|---|---|---|---|
| 3,132,125 | 5/1964 | Schwander et al. | 526/908 X |
| 3,925,338 | 12/1975 | Ort | 526/125 X |
| 4,228,261 | 10/1980 | Scholten et al. | 526/908 X |
| 4,521,573 | 6/1985 | Lee | 526/125 |
| 4,970,279 | 11/1990 | Bailly et al. | 526/63 X |
| 4,994,534 | 2/1991 | Rhee et al. | 526/168 X |

Primary Examiner—Fred Teskin
Attorney, Agent, or Firm—C. J. Vicari

[57] ABSTRACT

A process for producing sticky polymers at polymerization reaction temperatures in excess of the softening temperatures of the sticky polymers in a fluidized bed reactor in the presence of an inert particulate material which comprises utilizing as a support material for the catalyst, a support which includes silica having an average particle size of from about 60 to about 200 microns.

13 Claims, 1 Drawing Sheet

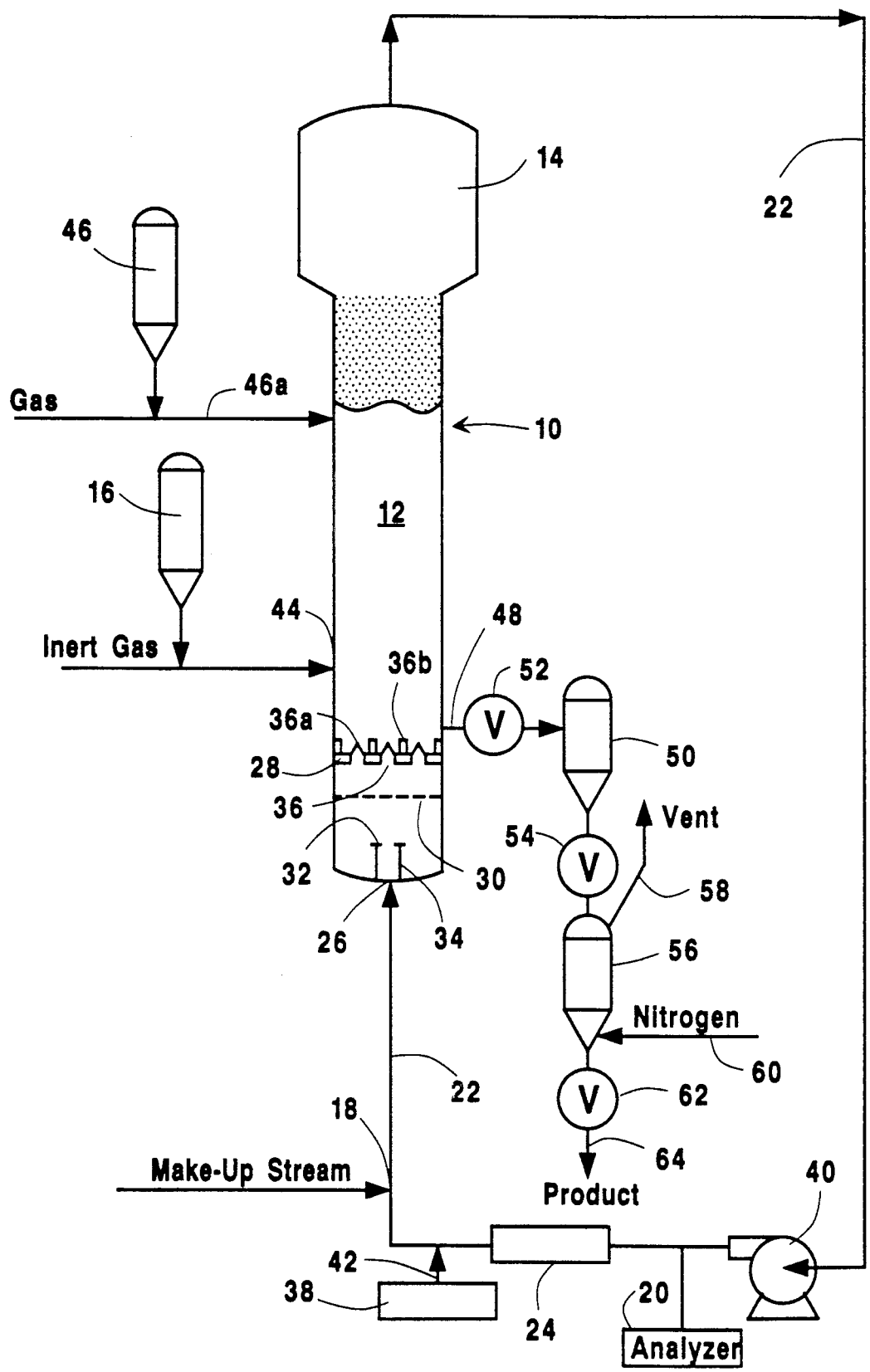

PROCESS FOR PRODUCING STICKY POLYMERS

BACKGROUND OF THE INVENTION

1. Field of the Invention

The present invention relates to an improved process for producing sticky polymers.

2. Description of the Prior Art

The introduction of high activity Ziegler-Natta catalyst systems has led to the development of new polymerization processes based on gas phase reactors such as disclosed in U.S. Pat. No. 4,482,687 issued Nov. 13, 1984. These processes offer many advantages over bulk monomer slurry processes or solvent processes. They are more economical and inherently safer in that they eliminate the need to handle and recover large quantities of solvent while advantageously providing low pressure process operation.

The versatility of the gas phase fluid bed reactor has contributed to its rapid acceptance. Alpha olefins polymers produced in this type of reactor cover a wide range of density, molecular weight distribution and melt indexes. In fact new and better products have been synthesized in gas phase reactors because of the flexibility and adaptability of the gas phase reactor to a large spectrum of operating conditions.

The term "sticky polymer" is defined as a polymer which, although particulate at temperatures below the sticking or softening temperature, agglomerates at temperatures above the sticking or softening temperature. The term "sticking temperature", is defined here as the temperature at which fluidization ceases because of excessive agglomeration of particles in the bed. The agglomeration may be spontaneous or occur over a period of time.

A polymer may be inherently sticky because of its chemical or mechanical properties or pass through a sticky phase during the production cycle. Sticky polymers are also referred to as non free-flowing polymers because of their tendency to compact into agglomerates of much larger size than the original particles. Polymers of this type show acceptable fluidity in a gas-phase fluidized bed reactor; however, once motion ceases, the additional mechanical force provided by the fluidizing gas passing through the distributor plate is insufficient to break up the agglomerates which form and the bed will not refluidize. These polymers are classified as those which have a minimum bin opening for free flow at zero storage time of two feet and a minimum bin opening for free flow at storage times of greater than five minutes of 4 to 8 feet.

Sticky polymers can also be defined by their bulk flow properties. This is called the Flow Function. On a scale of zero to infinity, the Flow Function of free flowing materials such as dry sand is infinite. The Flow Function of free flowing polymers is about 4 to 10, while the Flow Function of non-free flowing or sticky polymers is about 1 to 3.

Although many variables influence the degree of stickiness of the resin, it is predominantly governed by the temperature and the crystallinity of the resin. Higher temperatures of the resin increase its stickiness while less crystalline products such as very low density polyethylene (VLDPE), ethylene/propylene polymethylene (EPM), ethylene/propylene diene polymethylene (EPDM), and polypropylene (PP) copolymers usually display a larger tendency to agglomerate to form larger particles.

Thus the prior art has attempted to produce polymers at temperatures below the softening temperature of the polymers. This is based primarily on the fact that operating at or above the softening temperature would cause serious agglomeration problems.

More recently, U.S. Pat. No. 4,994,534 issued Feb. 19, 1991 to Seung J. Rhee et al and which is assigned to a common assignee discloses a process for producing sticky polymers at polymerization reaction temperatures in excess of the softening temperature of the sticky polymers in a fluidized bed reactor catalyzed by a transition metal catalyst. Basically the process comprises conducting the polymerization reaction above the softening temperatures of the sticky polymers in the presence of about 0.3 to about 60 weight percent, based on the weight of the final product, of an inert particulate material having a mean particle size of from about 0.01 to about 10 microns whereby polymer agglomeration of the sticky polymers is maintained at a size suitable for continuously producing the sticky polymers.

Thus, the above identified patent teaches that the addition of sufficient quantities of appropriate inert particulate materials (fluidization aids) to the reactor permits production of inherently sticky polymers. The term "inherently sticky" is used because the neat polymer is sticky, but after it is contacted with fluidization aid the polymer does not behave as a sticky polymer. Fluidization aids include carbon black and other carbon materials, silica, clays, and other materials which are inert under reaction conditions to produce the polymer. Levels of fluidization aids ranging from 0.3 to 60 weight percent, based on the weight of the polymer plus fluidization aid, have been effective in maintaining reactor operability.

Polyolefin polymers made in gas-phase, fluidized bed reactors are produced catalytically. The active catalytic species are generally supported on a relatively inert material, although there may be chemical as well as physical interaction between the catalytic species and the support. A typical support is silica gel. The size of the silica particles is frequently between 10 and 100 microns, with a small fraction of particles having diameters outside this range. A typical silica support used to make polyolefin polymers is Davison Grade 955 (available from W. R. Grace & Co.). The average particle size (APS) of catalyst made from it, as measured with a Microtrac analyzer, is 43 microns and the particle size distribution is shown in Table 1. Typical catalytic species impregnated on the support for use as polymerization catalysts include Ziegler-Natta type catalysts which contain titanium or vanadium active sites, and chromium salts.

When sticky polymers are produced with a fluidization aid in a gas-phase, fluidized-bed reactor using Ziegler-Natta catalyst supported on a relatively small APS silica, several operability deficiencies are experienced. In particular, over a period of several hours to several days, sheets of polymer form on the walls of the reactor above the fluidized bed. These sheets are normally formed along the conical transition section between the lower section of the reactor (the reaction zone) and the upper section of the reactor (the expanded section). Sheets are also formed in the lower part of the expanded section. As the sheets grow in size, pieces of them fall into the fluidized bed. If the pieces are sufficiently large, they tend to block the discharge port, necessitating shutdown of the reactor.

Another deficiency is the presence of slight agglomeration in the fluidized bed. Agglomerates are here defined as having a size in excess of 0.132 in. (larger than alternate sieve designation No. 6). Agglomerates are sometimes larger than 1 in. Agglomerates, particularly those larger than ¼ in., adversely affect fluidizability in the reactor and make resin handling downstream of the reactor difficult.

Another important deficiency is the need for high levels of fluidization aid, sometimes in excess of 50 wt % on a final product basis.

Accordingly it is a principal object of the present invention to continuously produce inherently sticky polymers such as ethylene propylene rubber (EPR) in a gas-phase, fluidized-bed reactor over long period of time with good reactor operability.

It is another object to produce sticky polymers which are substantially free of agglomerates.

A further object of the invention is to reduce the required amount of fluidization aid required for sticky polymer production while achieving the above objectives.

These and other objects will be apparent from the following description of the invention.

SUMMARY OF THE INVENTION

Broadly contemplated, the present invention provides a process for producing sticky polymers at polymerization reaction temperatures in excess of the softening temperatures of said sticky polymer in a fluidized bed reactor in the presence of a catalyst and a support for said catalyst and wherein said polymerization reaction is conducted in the presence of an inert particulate material, the improvement comprising employing as said support, one including silica having an average particle size of from about 60 to about 200 microns, preferably from 70 to 140 microns and having a weight fraction of no more than 30% silica particles, preferably no more than 20%, smaller than 44 microns.

Preferably the inert particulate material is fed to the reactor at a point above the fluidized bed.

BRIEF DESCRIPTION OF THE DRAWINGS

FIG. 1 illustrates a fluidized bed reaction scheme for producing sticky polymers.

DETAILED DESCRIPTION OF THE INVENTION

The fluidized bed reactor can be the one described in U.S. Pat. No. 4,558,790 except that the heat exchanger may be located after the compressor and the inert particulate material is fed above the fluidized bed surface. Other types of conventional reactors for the gas phase production of, for example, polyethylene or ethylene copolymers and terpolymers can also be employed. At the start up the bed is usually made up of polyethylene granular resin. During the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. A typical cycle gas can comprise ethylene, nitrogen, hydrogen, propylene, butene, or hexene monomers, diene monomers, either alone or in combination.

Examples of sticky polymers, which can be produced by subject process include ethylene/propylene rubbers and ethylene/propylene/diene termonomer rubbers, polybutadiene rubbers, high ethylene content propylene/ethylene block copolymers, poly (1-butene) (when produced under certain reaction conditions), very low density (low modulus) polyethylenes i.e., ethylene butene rubbers or hexene containing terpolymers, ethylene/propylene/ethylidenenorbornene and ethylene/propylene hexadiene terpolymers of low density.

Subject process can be carried out in a batch or continuous mode, the latter being preferred.

Characteristics of two types of resins which can be produced in subject process are as follows:

One type of resin is an ethylene/propylene rubber containing 25 to 65 percent, by weight, propylene. This material is sticky to the touch at reactor temperatures of 20° C. to 40° C. and has a severe tendency to agglomerate when allowed to settle for periods of more than two to five minutes. Another sticky resin is an ethylene/butene copolymer produced at reactor temperatures of 50° C. to 80° C. at density levels of 880 to 905 kilograms per cubic meter and melt index levels of 1 to 20.

The inert particulate materials which can be employed according to the present invention are disclosed in U.S. Pat. No. 4,994,534 and include carbon black, silica or clay. As disclosed in said patent, the carbon black employed can have a primary particle size of about 10 to about 100 nanometers, an average size of aggregate of about 0.1 to about 10 microns, a specific surface area of about 30 to about 1,500 m$^2$/gm and a dibutylphthalate absorption of about 80 to about 350 cc/100 grams.

Under conventional procedures, the inert particulate materials are normally introduced into the reactor either at the bottom of the reactor or to the recycle line directed into the bottom of the reactor. According to the present invention however the inert particulate materials are preferably introduced to the reactor at a point above the fluidized bed. It is preferred to treat the inert particulate material prior to entry into the reactor to remove traces of moisture and oxygen. This can be accomplished by purging the material with nitrogen gas, and heating by conventional procedures.

A fluidized bed reaction system which is particularly suited to production of sticky polymers by the practice of the process of the present invention is illustrated in the drawing. With reference thereto and particularly to FIG. 1, the reactor 10 comprises a reaction zone 12 and a velocity reduction zone 14.

In general, the height to diameter ratio of the reaction zone can vary in the range of about 2.7:1 to about 5:1. The range, of course, can vary to larger or smaller ratios and depends upon the desired production capacity. The cross-sectional area of the velocity reduction zone 14 is typically within the range of about 2.5 to about 2.9 multiplied by the cross-sectional area of the reaction zone 12.

The reaction zone 12 includes a bed of growing polymer particles, formed polymer particles and a minor amount of catalyst all fluidized by the continuous flow of polymerizable and modifying gaseous components in the form of make-up feed and recycle fluid through the reaction zone. To maintain a viable fluidized bed, the superficial gas velocity (SGV) through the bed must exceed the minimum flow required for fluidization which is typically from about 0.2 to about 0.8 ft/sec. depending on the average particle size of the product. Preferably the SGV is at least 1.0 ft/sec. above the minimum flow for fluidization or from about 1.2 to about 6.0 ft/sec. Ordinarily, the SGV will not exceed 6.0 ft/sec. and it is usually no more than 5.5 ft/sec.

Particles in the bed help to prevent the formation of localized "hot spots" and to entrap and distribute the particulate catalyst through the reaction zone. Accordingly, on start up, the reactor is charged with a seed bed of particulate polymer particles before gas flow is initiated. Such particles may be the same as the polymer to be formed or different. When different, they are withdrawn with the desired newly formed polymer particles as the first product. Eventually, a fluidized bed consisting of desired polymer particles supplants the start-up bed.

The catalysts used are often sensitive to oxygen, thus the catalyst used to produce polymer in the fluidized bed is preferably stored in a reservoir 16 under a blanket of a gas which is inert to the stored material, such as nitrogen or argon.

Fluidization is achieved by a high rate of fluid recycle to and through the bed, typically on the order of about 50 to about 150 times the rate of feed of make-up fluid. This high rate of recycle provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor.

Make-up fluid can be fed at point 18 to recycle line 22 although it is also possible to introduce makeup fluid between heat exchanger 24 and velocity reduction zone 14 in recycle line 22. The composition of the recycle stream is measured by a gas analyzer 20 and the composition and amount of the make-up stream is then adjusted accordingly to maintain an essentially steady state gaseous composition within the reaction zone.

The gas analyzer is a conventional gas analyzer which operates in conventional manner to indicate recycle stream composition which is then used to regulate the feed. The gas analyzer 20 can be positioned to receive gas from a point between the velocity reduction zone 14 and the dispenser 38, preferably after the compressor 40.

To ensure complete fluidization, the recycle stream and make-up stream are returned through recycle line 22 to the reactor at reactor base 26 below the bed. Preferably there is a gas distributor plate 28 above the point of return to aid in fluidizing the bed uniformly and to support the solid particles prior to start-up or when the system is shut down. The stream passing upwardly through the bed absorbs the heat of reaction generated by the polymerization reaction.

The portion of the gaseous stream flowing through the fluidized bed which did not react in the bed becomes the recycle stream which leaves the reaction zone 12 and passes into a velocity reduction zone 14 above the bed where a major portion of the entrained particles drop back into the bed thereby reducing solid particle carryover.

The recycle stream exiting the compressor is then returned to the reactor at its base 26 and thence to the fluidized bed through gas distributor plate 28. A fluid flow deflector 32 is preferably installed at the inlet to the reactor to prevent contained polymer particles from settling out and agglomerating into a solid mass and to maintain entrained or to re-entrain any liquid or solid particles which may settle out or become disentrained.

The fluid flow deflector comprises an annular disc supported at a stand off distance above the base 26 by the spacers 34 and divides the entering recycle stream into a central upward flow stream and an upward peripheral annular flow stream along the lower side walls of the reactor. The flow streams mix and then pass through protective screen 30, the holes or ports 36 of the distributor plate 28 and the angle caps 36a and 36b, secured to the upper surface of the distributor plate, and eventually into the fluidized bed.

The temperature of the bed is basically dependent on three factors: (1) the rate of catalyst injection which controls the rate of polymerization and the attendant rate of heat generation; (2) the temperature of the gas recycle stream and (3) the volume of the recycle stream passing through the fluidized bed. Of course, the amount of liquid introduced into the bed either with the recycle stream and/or by separate introduction also affects the temperature since this liquid vaporizes in the bed and serves to reduce the temperature. Normally the rate of catalyst injection is used to control the rate of polymer production. The temperature of the bed is controlled at an essentially constant temperature under steady state conditions by constantly removing the heat of reaction. By "steady state" is meant a state of operation where there is no change in the system with time. Thus, the amount of heat generated in the process is balanced by the amount of heat being removed and the total quantity of material entering the system is balanced by the amount of material being removed. As a result, the temperature, pressure, and composition at any given point in the system is not changing with time. No noticeable temperature gradient appears to exist within the upper portion of the bed. A temperature gradient will exist in the bottom of the bed in a layer or region extending above the distributor plate, e.g., for about 6 to about 12 inches, as a result of the difference between the temperature of the inlet fluid and temperature of the remainder of the bed. However, in the upper portion or region above this bottom layer, the temperature of the bed is essentially constant at the maximum desired temperature.

Good gas distribution plays an important role in the efficient operation of the reactor. The fluidized bed contains growing and formed particulate polymer particles, as well as catalyst particles. As the polymer particles are hot and possibly active, they must be prevented from settling, for if a quiescent mass is allowed to exist, any active catalyst present will continue to react and can cause fusion of the polymer particles resulting, in an extreme case, in the formation of a solid mass in the reactor which can only be removed with a great difficulty and at the expense of an extended downtime. Since the fluidized bed in a typical commercial size reactor may contain many thousand pounds of solids at any given time, the removal of a solid mass of this size would require a substantial effort. Diffusing recycle fluid through the bed at a rate sufficient to maintain fluidization throughout the bed is, therefore, essential.

Any fluid inert to the catalyst and reactants and which, if a liquid, will volatilize under the conditions present in the fluidized bed, can also be present in the recycle stream. Other materials, such as catalyst activator compounds, if utilized are preferably added to the reaction system downstream from compressor 40. Thus the materials may be fed into the recycle system from dispenser 38 through line 42 as shown in FIG. 1.

The fluid bed reactor may be operated at pressures of up to about 1000 psig. The reactor is preferably operated at a pressure of from about 250 to about 500 psig, with operations at the higher pressures in such ranges favoring heat transfer since an increase in pressure increases the unit volume heat capacity of the gas.

The catalysts which can be employed according to the present invention are those catalysts which are normally employed to produce sticky polymers except that the catalyst is impregnated on the large size silica support of the present invention. The preferred catalyst is a transition metal catalyst. Conventional techniques can be employed for impregnating the catalyst on the silica catalyst support such as disclosed for example in U.S. Pat. No. 4,521,723 issued Jun. 4, 1985.

The silica support which is employed in the present invention should have an average particle size of from 60 microns to 200 microns. Preferably such silica support has an average particle size of from 70 microns to 140 microns. No more than 30 percent by weight of the silica should have a particle size below 44 microns. It is preferred that no more than 20 percent by weight of the silica should have a particle size below 44 microns.

Most desirably, the silica support employed in the present invention has an average pore diameter of greater than 100 Angstrom units, and preferably greater than 150 Angstrom units. It is also desirable for such silica support to have a surface area of greater than 200 square meters per gram. The average pore volume of such silica is preferably from 1.4 ml/g. to 2.0 ml/g.

The silica support should be dry, that is, free of adsorbed water. Drying of the silica support is carried out by heating it at a temperature of about 600° C.

The catalyst which as stated previously is preferably a transition metal catalyst is injected intermittently or continuously into the bed at a desired rate at a point 44 which is above the distributor plate 28. Preferably, the catalyst is injected at a point in the bed where good mixing with polymer particles occurs. Injecting the catalyst at a point above the distributor plate is an important feature for satisfactory operation of a fluidized bed polymerization reactor. Since catalysts are highly active, injection of the catalyst into the area below the distributor plate may cause polymerization to begin there and eventually cause plugging of the distributor plate. Injection into the fluidized bed aids in distributing the catalyst throughout the bed and tends to preclude the formation of localized spots of high catalyst concentration which may result in the formation of "hot spots". Injection of the catalyst into the reactor is preferably carried out in the lower portion of the fluidized bed to provide uniform distribution and to minimize catalyst carryover into the recycle line where polymerization may begin and plugging of the recycle line and heat exchanger may eventually occur.

The inert particulate materials are introduced into the reactor from Vessel 46 through line 46a.

A gas which is inert to the catalyst, such as nitrogen or argon, is preferably used to carry the catalyst into the bed.

The rate of polymer production in the bed depends on the rate of catalyst injection and the concentration of monomer(s) in the recycle stream. The production rate is conveniently controlled by simply adjusting the rate of catalyst injection.

Under a given set of operating conditions, the fluidized bed is maintained at essentially a constant height by withdrawing a portion of the bed as product at the rate of formation of the particular polymer product. Complete instrumentation of both the fluidized bed and the recycle stream cooling system is, of course, useful to detect any temperature change in the bed so as to enable either the operator or a conventional automatic control system to make a suitable adjustment in the temperature of the recycle stream or adjust the rate of catalyst injection.

On discharge of particulate polymer product from the reactor 10, it is desirable, and preferable, to separate fluid from the product. There are numerous ways known to the art to accomplish this. One system is shown in the drawings. Thus, fluid and product leave the reactor 10 at point 48 and enter the product discharge tank 50 through a valve 52 which is designed to have minimum restriction to flow when opened, e.g., a ball valve. Positioned below product discharge tank 50 is a conventional valve 54 with the latter being adapted to provide passage of product into the product surge tank 56. The product surge tank 56 has venting means illustrated by line 58 and gas entry means illustrated by line 60. Also positioned at the base of product surge tank 56 is a discharge valve 62 which, when in the open position, discharges product for conveying to storage through line 64.

The practice of this invention is illustrated by a number of examples in which either small or large catalyst particles are used to make either non-sticky or inherently sticky polymers.

Thus, the following Examples will illustrate the present invention.

In each example, polyolefin polymer is produced continuously in a gas-phase, fluidized-bed reactor. The catalyst in each case is a vanadium-based one supported on silica particles. The catalyst was produced by conventional techniques and had a final composition of about 2.2 wt % vanadium, 3.5 wt % diethyl aluminum chloride, and 12 wt % tetrahydrofuran on the silica support. The catalyst system included a cocatalyst and a promoter. The cocatalyst was an aluminum alkyl, triethyl aluminum in Example 1 and tri-isobutyl aluminum in subsequent examples. The promoter was chloroform. The cocatalyst and promoter were separately fed in 5 to 10 wt % solutions of isopentane.

The reaction was carried out in a fluidized bed reactor similar to the one shown in FIG. 1 of the drawing. The conical transition section between the lower reactor section and the expanded section had an angle to the vertical of 7° and it began 9 feet above the distributor plate. Ethylene, hydrogen, and comonomer (combinations of one or two or propylene, diene, or butene) were continuously fed to the reactor. Also, catalyst, cocatalyst, and promoter were continuously fed. In the case where a fluidization aid was required, carbon black was fed to the reactor at short intervals. Product was periodically removed from the reactor through the product discharge tank.

EXAMPLE 1

A linear, low-density polyethylene with a resin density of 0.918 g/cm$^3$ and a melt index of 0.8 dg/min was produced. The catalyst was impregnated on Davison 955 silica and had an APS of 43 microns. Ethylene partial pressure was 140 psi, molar ratio of butene to ethylene in the reactor was 0.15 and hydrogen/ethylene molar ratio was 0.014. Reactor temperature was 85° C. The polymer was not sticky under these conditions. A fluidization aid was not used. The trial lasted for the full length of the test, more than 4 days, with no operational difficulties. Agglomerate formation was negligible and there was no evidence of polymer sheet formation on the reactor walls above the fluidized bed.

EXAMPLES 2-8

In these examples, a sticky EPDM (ethylene-propylenediene polymethylene) polymer was produced using vanadium-based catalyst impregnated on Davison 955 silica, a standard silica providing a catalyst APS of 43 microns. The diene was 2-ethylidene-5-norbornene (ENB). The fluidization aid, N-650 carbon black fluff, was fed to the reactor below the distributor plate. In examples 2 and 3, the ethylene partial pressure was 90 psi, the propylene/ethylene molar ratio was 1.5, the hydrogen/ethylene molar ratio was 0.001 and reactor temperature was 45° C. In Examples 4 through 8, the ethylene partial pressure was 90 psi, the propylene/ethylene molar ratio was 1.0, the hydrogen/ethylene molar ratio was 0.001, and reactor temperature was 50° C. In these seven examples the polymer produced contained 40-45 wt % propylene, 3-5 wt % ENB, and balance ethylene. Enough carbon black was fed to maintain good fluidization. In all of these examples, the rubber polymer produced was inherently sticky.

The results of Examples 2-8 are shown in Table 2. In every case, the trial was terminated because sheets of carbon-coated polymer formed on the walls of the conical transition section and then pieces of the sheets fell into the fluidized bed. Trial length ranged from ½ to 4½ days. In all cases, the average level of agglomerates in the bed exceeded 2 wt % and usually exceeded 5 wt %. The generation of agglomerates made it difficult to estimate the minimum carbon black level for good operability in these examples. That level appeared to be between 38 and 45 wt % carbon black.

EXAMPLES 9 and 10

In these examples, EPDM was produced in a similar way as in Examples 2-8. Again, the catalyst was impregnated on Davison 955 silica (43 micron APS). However, the fluidization aid was fed at a point 8 ft above the distributor plate. The fluidization aid was N-650 carbon black fluff in Example 9, N-650 carbon beads in Example 10. In both cases, reaction was carried out at 50° C., at an ethylene partial pressure of 90 psi, a propylene/ethylene molar ratio of 1.4, and a hydrogen/ethylene ratio of 0.0006.

Results are shown in Table 2. Again, both trials were terminated because of fallen sheets. The longest run was 3-½ days. Agglomerates averaged 2.3 and 6.7 wt %. The minimum level of carbon black required for good operability was 37 to 38 wt % but even at this level, wall fouling above the fluidized bed and excessive agglomerate generation occurred.

EXAMPLE 11

In this example, EPDM was produced using a catalyst impregnated on a large silica support having an APS of 84 microns and few fines (Davison 958 silica). The particle size distribution of this silica is shown in Table 1. Carbon black fluff (N-650 Grade) was fed to the reactor below the distributor plate. Reaction was carried out at 50° C. at an ethylene partial pressure of 90 psi, a propylene/ethylene molar ratio of 1.0, and a hydrogen/ethylene molar ratio of 0.0006.

Results of the trial are shown in Table 3. The trial lasted 4 days. At the end of the trial, the upper walls of the reactor appeared clean and there was no indication of sheet formation. The average agglomerate level in the bed was 1.2 wt %; for most of the trial it was below 0.5 wt %.

EXAMPLES 12-14

In these examples, an inherently sticky polymer, EPDM, was again produced. The vanadium-based catalyst used was impregnated on a large silica having an APS of 84 microns with few fines, Davison 958. In contrast to Example 11, the fluidization aid was fed to the reactor at a point about 1 ft. above the fluidized bed. The fluidization aid in Examples 12 and 13 was N-650 carbon black fluff; in Example 14, N-650 carbon black beads were used.

In each of the three examples, ethylene partial pressure was 90 psi, hydrogen/ethylene molar ratio was 0.0006, and reactor temperature was 50° C. The propylene/ethylene molar ratio was 1.0 in Example 12, 1.4 to 1.6 in Example 13, and 1.4 in Example 14.

Results are shown in Table 3. In each of these examples in which the large-size silica support was used, the trial lasted more than 5 days. Furthermore, there was no sheet formation or fouling of the walls of the lower reactor, conical transition section, or expanded section in Examples 12 and 13. No evidence of fouling was displayed during the first week of the trial of Example 14. In each of the three examples, agglomerates levels in the fluidized bed averaged 2 wt %. The minimum amount of carbon black required to avoid generation of agglomerates was 28 to 30 wt %.

EXAMPLE 15

An inherently sticky EPDM polymer was produced in a fluidized-bed reactor using a vanadium-based catalyst. The catalyst was impregnated on a very large silica support having an APS of 101 microns and few fines. The catalyst particle size distribution is shown in Table 1. The silica support is called Davison Fines-Free 958 silica.

Reaction was carried out at a reactor temperature of 50° C. using N-650 carbon black beads as fluidization aid. Ethylene partial pressure was 90 psi, propylene/ethylene molar ratio was 1.1 and hydrogen/ethylene molar ratio was 0.0013. Superficial gas velocity in the reactor was 1.7 ft/s. Fluidized bed height was 6.5 ft.

The trial was carried out for 100 hours and the reactor was operating well when the trial was ended. There was little indication of sheet formation when sufficient carbon beads were being fed to the reactor. The minimum level of carbon required to avoid generation of agglomerates was 32 wt %. The average agglomerates level was 3.2 wt %.

TABLE 1

| | Size Distribution of Catalysts Impregnated on Different Silicas % between listed size and next smaller size | | |
|---|---|---|---|
| Size Microns | Catalyst on 955 Silica | Catalyst on 958 Silica | Catalyst on Fines-Free 958 Silica |
| Greater than 176 | 0.0 | — | 4.1 |
| 176 | 0.0 | 12.7 | 25.9 |
| 125 | 6.1 | 31.9 | 33.5 |

TABLE 1-continued

Size Distribution of Catalysts
Impregnated on Different Silicas
% between listed size and next smaller size

| Size Microns | Catalyst on 955 Silica | Catalyst on 958 Silica | Catalyst on Fines-Free 958 Silica |
|---|---|---|---|
| 88 | 13.5 | 25.7 | 18.0 |
| 62 | 20.1 | 15.4 | 7.7 |
| 44 | 23.6 | 4.4 | 3.0 |
| 31 | 15.8 | 2.8 | 1.0 |
| 22 | 9.5 | 6.3 | 0.9 |
| 16 | 1.6 | 0.0 | 1.7 |
| 11 | 3.1 | 0.0 | 2.3 |
| 7.8 | 1.0 | 0.0 | 1.6 |
| 5.5 | 2.3 | 0.0 | 0.2 |
| 3.9 | 2.9 | 0.4 | 0.0 |
| 2.8 | 0.0 | 0.0 | 0.0 |
| Mean Diameter (Volume), microns | 43.2 | 84.2 | 101.2 |

TABLE 2

Operability Results when Producing
Sticky EPDM With Catalyst
Impregnated on Standard Davison 955 Silica

| Example | Superficial Velocity | Fluidized Bed ft/s | Average Time, Hour Height, ft | Production | Agglomerates On No. 6 Screen wt % |
|---|---|---|---|---|---|
| 2 | 1.4 | 8.0 | 45.0 | 9.2 | Fallen Sheet |
| 3 | 1.5 | 10 | 108 | 7.6 | Fallen Sheet |
| 4 | 1.3 | 9.5 | 55 | 4.5 | Fallen Sheet |
| 5 | 1.5 | 6 | 56 | 2.6 | Fallen Sheet |
| 6 | 2.0 | 8 | 12 | — | Fallen Sheet |
| 7 | 2.0 | 9 | 104 | 12.2 | Fallen Sheet |
| 8 | 2.7 | 9.5 | 44 | 17.1 | Fallen Sheet |
| 9 | 1.7 | 7 | 80 | 2.3 | Fallen Sheet |
| 10 | 1.7 | 7 | 56 | 6.7 | Fallen Sheet |

TABLE 3

Operability Results when Producing Sticky EPDM
With Catalyst Impregnated on Large-Size Silica (Davison 958)

| Example | Superficial Velocity ft/s | Fluidized Bed Height, ft | Production Time, Hour | Average Agglomerates On No. 6 Screen wt % |
|---|---|---|---|---|
| 11 | 2.6 | 9.5 | 94 | 1.2 |
| 12 | 1.8 | 7 | 124 | 1.6 |
| 13 | 1.7 | 7 | 128 | 2.1 |
| 14 | 1.7–2.4 | 7 | 252 | 1.8 |

As will be discerned from an analysis of the examples, by impregnating the catalyst on a large-size silica support, operability during production of inherently sticky EPR was dramatically improved. When production was carried out using preferred procedures and feeding a sufficient quantity of carbon black fluidization aid into the reactor, sheet formation in the transition cone ceased when using the large-size silica support. Continuous trials were carried out for longer than a week with no evidence of sheet formation. Furthermore, levels of agglomerates in the product were maintained below 2.5 wt%, and frequently below 1 wt%. In addition, the amount of carbon black required to maintain good reactor operability was reduced by about 25%, compared to that required when using the smaller standard (955) silica.

What is claimed is:

1. A process for producing sticky polymers at polymerization reaction temperatures in excess of the softening temperatures of said sticky polymers in a fluidized bed reactor in the presence of a catalyst and a support for said catalyst and wherein said polymerization reaction is conducted in the presence of an inert particulate material, the improvement comprising employing as said support, one including silica having an average particle size of from about 60 to about 200 microns and having a weight fraction of silica particles of no more than 30% smaller than 44 microns.

2. A process according to claim 1 wherein said inert particulate material is introduced into said reactor at a point above said fluidized bed.

3. A process according to claim 1 wherein said silica in said support has an average particle size of from about 70 to about 140 microns, and having a weight fraction of silica particles of no more than 20% of particles smaller than about 44 microns.

4. A process according to claim 1 wherein said inert particulate material is carbon black or silica or clay.

5. A process according to claim 1 wherein said sticky polymers are:
   a. ethylene propylene rubbers;
   b. ethylene propylene diene termonomer rubbers;
   c. polybutadiene rubbers; and
   d. high ethylene content propylene ethylene block copolymers.

6. A process according to claim 5 wherein said ethylene propylene diene termonomers are ethylene/propylene/ethylidenenorbornene termonomers.

7. A process according to claim 5 wherein said ethylene propylene diene termonomers are ethylene/propylene/hexadiene termonomers.

8. A process according to claim 1 wherein said inert particulate material is carbon black having a primary particle size of about 10 to about 100 nanometers, an average size of aggregate of about 0.1 to about 10 microns, a specific surface area of about 30 to about 1,500 $m^2/gm$ and a dibutylphthalate absorption of about 80 to about 350 cc/100 grams.

9. A process according to claim 1 wherein said silica support has an average pore diameter of greater than 100 Angstrom units, a surface area greater than 200 square meters per gram and an average pore volume of 1.4 ml/g to 2.0 ml/g.

10. A process for producing elthylene propylene ethylidene norbornene terpolymer at polymerization reaction temperatures in excess of the softening temperature of said ethylene propylene ethylidene norbornene terpolymer in a fluidized bed reactor in the presence of a catalyst and a support for said catalyst and wherein said polymerization reaction is conducted in the presence of carbon black or silica or clay, the improvement comprising employing as said support, one including silica having an average particle size of from about 70 to about 140 microns and having a weight fraction of silica particles of no more than 20% smaller than 44 microns.

11. A process according to claim 10 wherein said inert particulate material is introduced into said reactor at a point above said fluidized bed.

12. A process according to claim 10 wherein said inert particulate material is carbon black having a primary particle size of about 10 to about 100 nanometers, an average size of aggregate of about 0.1 to about 10 microns, a specific surface area of about 30 to about 1,500 $m^2/gm$ and a dibutylphthalate absorption of about 80 to about 350 cc/100 grams.

13. A process according to claim 10 wherein said silica support has an average pore diameter of greater than 100 Angstrom units, a surface area greater than 200 square meters per gram and an average pore volume of 1.4 ml/g to 2.0 ml/g.

* * * * *